United States Patent
Tang

(10) Patent No.: US 10,841,963 B2
(45) Date of Patent: Nov. 17, 2020

(54) COMMUNICATION METHOD AND COMMUNICATION DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/311,142

(22) PCT Filed: Jul. 28, 2016

(86) PCT No.: PCT/CN2016/092104
§ 371 (c)(1),
(2) Date: Dec. 18, 2018

(87) PCT Pub. No.: WO2018/018512
PCT Pub. Date: Feb. 1, 2018

(65) Prior Publication Data
US 2019/0254086 A1    Aug. 15, 2019

(51) Int. Cl.
*H04W 76/10* (2018.01)
*H04W 76/27* (2018.01)
*H04W 72/04* (2009.01)
*H04W 80/02* (2009.01)

(52) U.S. Cl.
CPC ........... *H04W 76/10* (2018.02); *H04W 72/04* (2013.01); *H04W 76/27* (2018.02); *H04W 80/02* (2013.01)

(58) Field of Classification Search
CPC ..... H04W 72/04; H04W 76/10; H04W 76/27; H04W 80/02
USPC .......................................................... 370/329
See application file for complete search history.

(56) References Cited

U.S. PATENT DOCUMENTS

| | | | |
|---|---|---|---|
| 2006/0045035 A1* | 3/2006 | Liu | H04W 52/0229 370/311 |
| 2007/0076641 A1 | 4/2007 | Bachl et al. | |
| 2008/0279171 A1* | 11/2008 | Kim | H04L 1/1685 370/346 |
| 2009/0268700 A1* | 10/2009 | Son | H04W 4/90 370/336 |

(Continued)

FOREIGN PATENT DOCUMENTS

| CN | 103716912 A | 4/2014 |
|---|---|---|
| CN | 105210346 A | 12/2015 |

(Continued)

OTHER PUBLICATIONS

Extended European search report issued in corresponding European application No. 16910093.0 dated Jun. 13, 2019.

(Continued)

*Primary Examiner* — Robert J Lopata

(57) ABSTRACT

Communication methods and communication apparatuses are provided. The communication method includes: a first device receives a Layer 2 Protocol Data. Unit (PDU) sent by a second device; and the first device determines a connection state in which the first device and the second device need to be according to the Layer 2 PDU.

16 Claims, 4 Drawing Sheets

100

A first device receives a Layer 2 PDU sent by a second device — S110

The first device determines a connection state in which the first device and the second device need to be according to the Layer 2 PDU — S120

(56) References Cited

U.S. PATENT DOCUMENTS

| | | | | |
|---|---|---|---|---|
| 2012/0120843 A1* | 5/2012 | Anderson | ......... | H04W 52/0232 |
| | | | | 370/253 |
| 2013/0010619 A1* | 1/2013 | Fong | ..................... | H04W 72/14 |
| | | | | 370/252 |
| 2015/0156764 A1* | 6/2015 | Yang | ................. | H04W 72/0413 |
| | | | | 370/329 |
| 2016/0142939 A1* | 5/2016 | Yi | ......................... | H04W 74/06 |
| | | | | 370/329 |
| 2016/0262050 A1* | 9/2016 | Merlin | ................... | H04L 5/0053 |
| 2017/0034862 A1* | 2/2017 | Ma | ........................ | H04W 76/14 |

FOREIGN PATENT DOCUMENTS

| | | |
|---|---|---|
| CN | 105472697 A | 4/2016 |
| EP | 2140583 A1 | 1/2010 |
| EP | 2827676 A1 | 1/2015 |
| JP | 2013085299 A | 5/2013 |

OTHER PUBLICATIONS

English translation of Notice of Reasons for Refusal, JP application 2018567117 dated Jun. 15, 2020.

English translation of CN First Office Action for CN applicationa No. 201680087514.2 dated May 6, 2020.

English translation of IN OA for application 201817049470 dated Jul. 8, 2020.

EP Examination in EP Application No. 16910093.0 dated Jul. 28, 2020.

* cited by examiner

COMMUNICATION METHOD AND COMMUNICATION DEVICE

CROSS-REFERENCE TO RELATED APPLICATION(S)

This application is a 371 application of International Application No. PCT/CN2016/092104, filed on Jul. 28, 2016, the entire disclosure of which is hereby incorporated by reference.

TECHNICAL FIELD

The present disclosure relates to the field of communication, and more particularly to communication methods and communication apparatuses.

BACKGROUND

In Universal Mobile Telecommunications System (UMTS), there are multiple states of a connection between two communication devices. Taking the states of a connection between a terminal device and a network-side device as an example, when the terminal device is in an active state, the terminal device and the network-side device are in a connection state; and when the terminal device is in an inactive state, the terminal device and the network-side device are in another connection state. When there is no data transmission between the terminal device and the network-side device, the network-side device instructs the terminal device to enter an inactive state by sending Radio Resource Control (RRC) high-level signaling to the terminal device, so that the terminal device and the network-side device are in a corresponding connection state. However, the RRC high-level signaling requires a complicated encapsulation process and system overhead is great when the signaling is sent. In addition, the terminal device needs to consume more time and power when parsing an RRC high-level signaling with higher complexity.

SUMMARY

Implementations of the present disclosure provide communication methods and communication apparatuses.

In a first aspect, a communication method is provided, which includes: a first device receives a Layer 2 Protocol Data Unit (PDU) sent by a second device; the first device determines a connection state in which the first device and the second device need to be according to the Layer 2 PDU.

In a possible implementation mode of the first aspect, the first device is a terminal device and the second device is a network-side device; or, the first device is a network-side device and the second device is a terminal device. The connection state in which the first device and the second device need to be includes a first connection state or a second connection state, wherein the first connection state is a connection state between the terminal device and the network-side device when the terminal device is in an active state; and the second connection state is a connection state between the terminal device and the network-side device when the terminal device is in an inactive state.

In a possible implementation mode of the first aspect, determining by the first device the connection state in which the first device and the second device need to be according to the Layer 2 PDU includes: the first device determines the connection state in which the first device and the second device need to be according to whether the Layer 2 PDU carries a data packet or according to first information carried in the Layer 2 PDU, wherein the first information is used for indicating whether there is subsequent data transmission between the first device and the second device.

In a possible implementation mode of the first aspect, determining by the first device the connection state in which the first device and the second device need to be according to whether the Layer 2 PDU carries a data packet or according to the first information carried in the Layer 2 PDU includes: determining that the first device and the second device need to be in the first connection state when the first information is used for indicating that there is subsequent data transmission between the first device and the second device; determining that the first device and the second device need to be in the second connection state when the first information is used for indicating that there is no subsequent data transmission between the first device and the second device.

In a possible implementation mode of the first aspect, determining by the first device the connection state in which the first device and the second device need to be according to whether the Layer 2 PDU carries a data packet or according to the first information carried in the Layer 2 PDU includes: determining that the first device and the second device need to be in the first connection state when the Layer 2 PDU carries a data packet; determining that the first device and the second device need to be in the second connection state when the Layer 2 PDU does not carry any data packet.

In a possible implementation mode of the first aspect, the Layer 2 PDU carries second information for indicating the connection state in which the first device and the second device need to be, and determining by the first device the connection state in which the first device and the second device need to be according to the Layer 2 PDU includes: the first device determining the connection state in which the first device and the second device need to be according to the second information carried in the Layer 2 PDU.

In a possible implementation mode of the first aspect, the first device and the second device are currently in the first connection state, and the connection state in which the first device and the second device need to be is the second connection state, the communication method further includes: the first device starts a first timer after receiving the Layer 2 PDU; or, the first device starts a first timer after sending third information to the second device, wherein the third information is used for indicating that the first device has determined to enter the second connection state; when the first timer expires, the first device changes the connection state from the first connection state to the second connection state.

In a possible implementation mode of the first aspect, the Layer 2 PDU carries fourth information for indicating a timing duration of the first timer, and starting the first timer includes: starting the first timer according to the fourth information.

In a possible implementation mode of the first aspect, the Layer 2 PDU carries fifth information for requesting to acquire a timing duration of the second timer of the second device. The communication method further includes: the first device determines the timing duration of the second timer; the first device sends sixth information to the second device, wherein the sixth information is used for indicating the timing duration of the second timer; and starting the first timer includes: the first device starts the first timer after sending the sixth information to the second device; or the first device starts the first timer after sending the sixth information to the second device and receiving seventh information sent by the second device, wherein the seventh information is used for indicating that the second device has determined to enter the second connection state.

In a possible implementation mode of the first aspect, after the first device receives the Layer 2 PDU sent by the second device, the communication method further includes: the first device sends eighth information to the second device, wherein the eighth information is used for indicating that the first device has correctly received the Layer 2 PDU; or the first device sends ninth information to the second device, wherein the ninth information is used for indicating the connection state in which the first device and the second device need to be.

Optionally, in a possible implementation mode of the first aspect, the first timer is configured with at least one first timing duration, and the at least one first timing duration includes the timing duration of the first timer indicated by the fourth information. The second timer is configured with at least one second timing duration, and the at least one second timing duration includes the timing duration of the second timer indicated by the sixth information.

Optionally, in a possible implementation mode of the first aspect, starting the first timer includes: starting the first timer according to the sixth information.

Optionally, in a possible implementation mode of the first aspect, the timing duration of the first timer and/or the timing duration of the second timer may be configured by a network-side device or specified through a protocol. The first timer and/or the second timer are/is based on configuration of a terminal or based on bearer configuration of the terminal.

Optionally, in a possible implementation mode of the first aspect, the Layer 2 PDU includes a Packet Data Convergence Protocol (PDCP) layer PDU, a Radio Link Control (RLC) layer PDU, or a Media Access Control (MAC) layer PDU.

Optionally, in a possible implementation mode of the first aspect, an indication field for carrying the first information, the second information, the fourth information, or the fifth information may be located at a header of the Layer 2 PDU, or at a tail of the Layer 2 PDU, or at any position in the Layer 2 PDU. The indication field may be a newly added field in the PDU, or an existing field containing a special value in the PDU.

In a second aspect, a communication method is provided, which includes: a second device generates a Layer 2 Protocol Data Unit (PDU), which is used for a first device to determine a connection state in which the first device and the second device need to be; the second device sends the Layer 2 PDU to the first device.

In a possible implementation mode of the second aspect, the first device is a terminal device and the second device is a network-side device; or, the first device is a network-side device and the second device is a terminal device. The connection state in which the first device and the second device need to be includes a first connection state or a second connection state, wherein the first connection state is a connection state between the terminal device and the network-side device when the terminal device is in an active state; the second connection state is a connection state between the terminal device and the network-side device when the terminal device is in an inactive state.

In a possible implementation mode of the second aspect, generating by the second device the Layer 2 PDU includes: the second device generates the Layer 2 PDU according to whether there is currently data packet transmission between the first device and the second device and/or whether there is subsequent data transmission between the first device and the second device.

In a possible implementation mode of the second aspect, the second device generates the Layer 2 PDU according to whether there is currently data packet transmission between the first device and the second device and/or whether there is subsequent data transmission between the first device and the second device, which includes: the second device generates the Layer 2 PDU carrying a data packet when there is currently data packet transmission between the first device and the second device; the second device generates the Layer 2 PDU without carrying any data packet when there is currently no data packet transmission between the first device and the second device; the second device generates the Layer 2 PDU carrying first information for indicating that there is no subsequent data transmission between the first device and the second device when there is no subsequent data transmission between the first device and the second device; the second device generates the Layer 2 PDU carrying first information for indicating that there is subsequent data transmission between the first device and the second device when there is subsequent data transmission between the first device and the second device.

In a possible implementation mode of the second aspect, the method further includes: the second device determines the connection state in which the first device and the second device need to be; generating by the second device the Layer 2 PDU includes: the second device generates the Layer 2 PDU carrying second information for indicating the connection state in which the first device and the second device need to be.

In a possible implementation mode of the second aspect, the first device and the second device are currently in the first connection state, and the connection state in which the first device and the second device need to be is the second connection state; and the communication method further includes: the second device starts a second timer after sending the Layer 2 PDU to the first device; or, the second device starts a second timer after receiving third information sent by the first device, wherein the third information is used for indicating that the first device has determined to enter the second connection state; when the second timer expires, the second device changes the connection state from the first connection state to the second connection state.

In a possible implementation mode of the second aspect, generating by the second device the Layer 2 PDU includes: the second device generates the Layer 2 PDU carrying fourth information for indicating a timing duration of the first timer of the first device, for the first device to start the first timer according to the fourth information.

In a possible implementation mode of the second aspect, generating by the second device the Layer 2 PDU includes: the second device generates the Layer 2 PDU carrying fifth information for requesting to acquire a timing duration of the second timer. The communication method further includes: the second device receives sixth information sent by the first device, wherein the sixth information is used for indicating the timing duration of the second timer; starting the second timer includes: the second device starts the second timer according to the sixth information after receiving the sixth information sent by the first device; or the second device starts the second timer according to the sixth information after receiving the sixth information sent by the first device and sending seventh information to the first device, wherein the seventh information is used for indicating that the second device has determined to enter the second connection state.

In a possible implementation mode of the second aspect, after the second device sends the Layer 2 PDU to the first device, the communication method further includes: the second device receives eighth information sent by the first device, wherein the eighth information is used for indicating that the first device has correctly received the Layer 2 PDU; or the second device receives ninth information sent by the first device, wherein the ninth information is used for indicating the connection state in which the first device and the second device need to be.

Optionally, in a possible implementation mode of the second aspect, the first timer is configured with at least one first timing duration, and the at least one first timing duration includes the timing duration of the first timer indicated by the fourth information. The second timer is configured with at least one second timing duration, and the at least one second timing duration includes the timing duration of the second timer indicated by the sixth information.

Optionally, in a possible implementation mode of the second aspect, starting the first timer includes: starting the first timer according to the fourth information.

Optionally, in a possible implementation mode of the second aspect, the timing duration of the first timer and/or the timing duration of the second timer may be configured by a network-side device or specified through a protocol. The first timer and/or the second timer are/is based on configuration of a terminal or based on bearer configuration of the terminal.

Optionally, in a possible implementation mode of the second aspect, the Layer 2 PDU includes a Packet Data Convergence Protocol (PDCP) layer PDU, a Radio Link Control (RLC) layer PDU, or a Media Access Control (MAC) layer PDU.

Optionally, in a possible implementation mode of the second aspect, an indication field for carrying the first information, the second information, the fourth information, or the fifth information may be located at a header of the Layer 2 PDU, or at a tail of the Layer 2 PDU, or at any position in the Layer 2 PDU. The indication field may be a newly added field in the PDU, or an existing field containing a special value in the PDU.

In a third aspect, a communication method is provided, which includes: starting a timer; and changing a connection state between a first device and a second device from a first connection state to a second connection state when the timer expires.

In a possible implementation mode of the third aspect, the first device is a terminal device and the second device is a network-side device; or, the first device is a network-side device and the second device is a terminal device. The connection state in which the first device and the second device need to be includes a first connection state, or a second connection state, wherein the first connection state is a connection state between the terminal device and the network-side device when the terminal device is in an active state; the second connection state is a connection state between the terminal device and the network-side device when the terminal device is in an inactive state.

In a possible implementation mode of the third aspect, starting the timer includes: starting the timer after the first device sends a data packet or signaling to the second device; or starting the timer after the first device receives first information of the data packet or signaling sent by the second device, wherein the first information is used for indicating that the second device has correctly received the data packet or the signaling.

In a possible implementation mode of the third aspect, starting the timer includes: starting the timer after the second device receives a data packet or signaling sent by the first device; or starting the timer after the second device sends second information corresponding to the data packet or signaling to the first device, wherein the second information is used for indicating that the second device has correctly received the data packet or the signaling; or starting the timer after a radio bearer between the first device and the second device has been established.

In a possible implementation mode of the third aspect, when all radio bearers between the first device and the second device correspond to a single timer, starting the timer after a radio bearer between the first device and the second device has been established includes: starting the timer after all radio bearers between the first device and the second device have been established.

In a possible implementation mode of the third aspect, when each radio bearer of all radio bearers between the first device and the second device corresponds to one timer, starting the timer after a radio bearer between the first device and the second device has been established includes: starting a corresponding timer after each radio bearer between the first device and the second device has been established; changing the connection state between the first device and the second device from the first connection state to the second connection state when time configured by the timer expires includes: changing the connection state between the first device and the second device from the first connection state to the second connection state when all timers corresponding to all radio bearers expire.

In a fourth aspect, a communication apparatus is provided for implement the method in the first aspect or in any possible implementation mode of the first aspect. Specifically, the communication apparatus includes modules and/or units configured to implement the method in the first aspect or in any possible implementation mode of the first aspect.

In a fifth aspect, a communication apparatus is provided for implement the method in the second aspect or in any possible implementation mode of the second aspect. Specifically, the communication apparatus includes modules and/or units configured to implement the method in the second aspect or in any possible implementation mode of the second aspect.

In a sixth aspect, a communication apparatus is provided for implement the method in the third aspect or in any possible implementation mode of the third aspect. Specifically, the communication apparatus includes modules and/or units configured to implement the method in the third aspect or in any possible implementation mode of the third aspect.

In a seventh aspect, a communication device is provided. The communication device includes a transceiver, a storage, a processor, and a bus system. The transceiver, the storage and the processor are connected through the bus system. The storage is configured to store instructions, and the processor is configured to execute the instructions stored in the storage to control the transceiver to transmit and receive signals. The instructions stored in the storage, when executed by the processor, cause the processor to implement the method in the first aspect or in any possible implementation mode of the first aspect.

In an eighth aspect, a communication device is provided. The communication device includes a transceiver, a storage, a processor, and a bus system. The transceiver, the storage and the processor are connected through the bus system. The storage is configured to store instructions, and the processor is configured to execute the instructions stored in the storage to control the transceiver to transmit and receive signals. The instructions stored in the storage, when executed by the processor, cause the processor to implement the method in the second aspect or in any possible implementation mode of the second aspect.

In a ninth aspect, a communication device is provided. The communication device includes a transceiver, a storage, a processor, and a bus system. The transceiver, the storage and the processor are connected through the bus system. The storage is configured to store instructions, and the processor is configured to execute the instructions stored in the storage to control the transceiver to transmit and receive signals. The instructions stored in the storage, when executed by the processor, cause the processor to implement the method in the third aspect or in any possible implementation mode of the third aspect.

In a tenth aspect, a computer readable medium is provided. The computer readable medium is used to store a computer program including instructions for implementing the method in the first aspect or in any possible implementation mode of the first aspect.

In an eleventh aspect, a computer readable medium is provided. The computer readable medium is used to store a computer program including instructions for implementing the method in the second aspect or in any possible implementation mode of the second aspect.

In a twelfth aspect, a computer readable medium is provided. The computer readable medium is used to store a computer program including instructions for implementing the method in the third aspect or in any possible implementation mode of the third aspect.

BRIEF DESCRIPTION OF DRAWINGS

To describe the technical schemes of implementations of the present application more clearly, drawings that are referred to in the description of the implementations or the related art will be briefly introduced below. It is apparent that drawings in the following description are only some implementations of the present application, and for those of ordinary skill in the art, other drawings can be obtained according to these drawings without paying an inventive effort.

DETAILED DESCRIPTION

Figure 1:
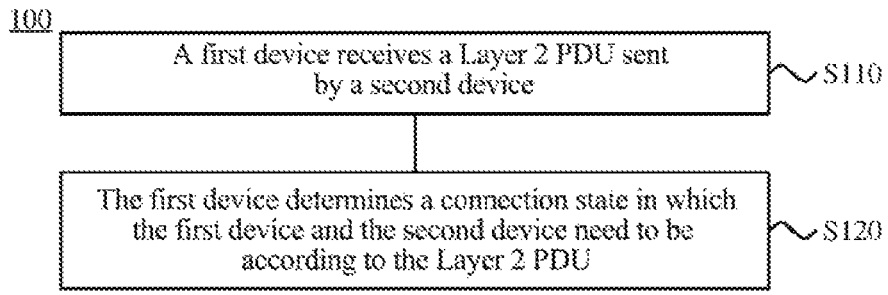
FIG. 1 is a schematic flowchart of a communication method according to an implementation of the present disclosure.

The technical schemes in implementations of the present application will be clearly and completely described below with reference to the drawings in the implementations of the present application. It is apparent that the described implementations are a part, but not all, of implementations of the present application. Based on the implementations in the present application, all other implementations obtained by those of ordinary skill in the art without paying an inventive effort shall fall within the scope of protection of the present application.

The present application provides various implementations in combination with terminal devices and access network devices. A terminal device may also be referred to as an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, or a terminal device in a future 5G network.

A network-side device may be used to communicate with mobile devices. The network-side device may be a Base Transceiver Station (BTS) in Global System of Mobile Communication (GSM) or Code Division Multiple Access (CDMA); or may be a NodeB (NB) in Wideband Code Division Multiple Access (WCDMA); or may be an Evolutional Node B (eNB or eNodeB) in Long Term Evolution (LTE); or may be a relay station or access point, an on-board device, a wearable device, or an access network device in a future 5G network.

For ease of understanding implementations of the present application, the following elements are firstly introduced before describing the implementations of the present application.

States of a connection between a terminal device and a network-side device include at least the following:

1. Disconnection state. When the terminal device is in an idle mode, there is a disconnection state between the terminal device and the network-side device. Herein, the idle mode has only an idle state. In the idle state, all connections of the terminal device are closed at an access layer. In UTRAN, no context is established for a terminal device in the idle mode. If a specific terminal device is to be addressed, a paging message has to be sent to all terminal devices or multiple terminal devices monitoring the same paging period in one cell.

2. A connection state between the terminal device and the network-side device when the terminal device is in an active state. Herein, the active state includes a state of the terminal device when the terminal device is in a connection mode of high-level signaling connection.

3. A connection state between the terminal device and the network-side device when the terminal device is in an inactive state. When the terminal device is in the inactive state, the RRC connection and bearer of the terminal device are retained in the network-side device, but a behavior of the terminal device in the access layer is not notified to the network-side device.

FIG. 1 is a schematic flowchart of a communication method 100 according to an implementation of the present disclosure. The communication method 100 may include acts S110-S120.

In S110, a first device receives a Layer 2 Protocol Data Unit (PDU) sent by a second device.

In S120, the first device determines a connection state in which the first device and the second device need to be according to the Layer 2 PDU.

Specifically, as described above, the connection state between the first device and the second device may include multiple types, and the first device may determine the connection state needed to be in according to the Layer 2 PDU. Optionally, as an example, the Layer 2 PDU may include a Packet Data Convergence Protocol (PDCP) layer PDU, a Radio Link Control (RLC) layer PDU, or a Media Access Control (MAC) layer PDU.

Compared with parsing an RRC high-level signaling sent by a network-side device by a terminal device in the related art, the process of parsing the Layer 2 PDU by the first device is relatively simple, which can reduce communication complexity, reduce system overhead and shorten time delay of parsing.

Further, in the scheme, both the first device and the second device are network-side devices; or both the first device and the second device are terminal devices; or one of the first device and the second device is a network-side device and the other is a terminal device. Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state. The second connection state is a connection state between the terminal device and the network-side device when the terminal device is in an inactive state. The communication method 100 can determine connection states in which various communication devices need to be, which has high flexibility, good compatibility and scalability.

Furthermore, in the scheme, the execution subject may be the terminal device or the network-side device, and the terminal device or the network-side device may determine timely the connection state needed to be in according to the Layer 2 PDU, thus the terminal device or the network-side device may efficiently change the connection state when the connection state needs to be changed.

In the above, a communication method is described from an overall perspective with reference to FIG. 1. In the communication method 100, the first device may determine the connection state which the first device and the second device need to enter according to the Layer 2 PDU. How the first device determines the connection state needed to be entered according to the Layer 2 PDU will be described in detail below in combination with several specific implementations.

Optionally, as an example, the first device may determine the connection state in which the first device and the second device need to be according to whether the Layer 2 PDU carries a data packet or according to first information carried in the Layer 2 PDU. The first information is used for indicating whether there is subsequent data transmission between the first device and the second device.

Specifically, determining by the first device the connection state in which the first device and the second device need to be according to the first information carried in the Layer 2 PDU may include: when the first information is used for indicating that there is subsequent data transmission between the first device and the second device, the first device determines that the first device and the second device need to be in a first connection state; when the first information is used for indicating that there is no subsequent data transmission between the first device and the second device, the first device determines that the first device and the second device need to be in a second connection state.

Figure 2:
FIG. 2 is a schematic diagram of a layer 2 PDU according to an implementation of the present disclosure.

FIG. 2 is a schematic diagram of a Layer 2 PDU according to an implementation of the present disclosure. As shown in FIG. 2, the Layer 2 PDU is an RLC PDU, and the header of the RLC PDU includes an L field (which may be referred to as an indication field) for carrying the first information. The value and meaning of the indication field may be as shown in table 1.

TABLE 1

| Value of the indication field | Meaning |
|---|---|
| 0 | There is no data transmission subsequently. |
| 1 | There is data transmission subsequently. |

After the first device receives the PDU carrying the first information, if the value of the indication field carrying the first information is "0", the first device determines that the first device and the second device need to be in a second connection state according to the first information; if the value of the indication field carrying the first information is "1", the first device determines that the first device and the second device need to be in a first connection state according to the first information.

Figure 3:
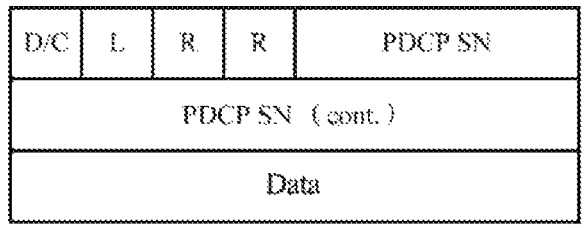
FIG. 3 is a schematic diagram of a layer 2 PDU according to another implementation of the present disclosure.

It should be noted that if the first device determines the connection state needed to be in according to the first information, the Layer 2 PDU may carry a data packet, or may not carry any data packet (i.e., the Layer 2 PDU may be a state packet). Optionally, if the PDU carries a data packet, the first information may also be used for indicating whether the data packet carried by the Layer 2 PDU is the last data packet transmitted by the second device. FIG. 3 is a schematic diagram of a Layer 2 PDU according to another implementation of the present disclosure. As shown in FIG. 3, the Layer 2 PDU is a PDCP PDU, and the header of the PDCP PDU includes an L field (which may be referred to as an indication field) for carrying the first information, and the value and meaning of the indication field may be as shown in table 2.

TABLE 2

| Value of the indication field | Meaning |
| --- | --- |
| 0 | The data packet is not the last data packet. |
| 1 | The data packet is the last data packet. |

In the scheme, the first information and the data packet may be carried together in the Layer 2 PDU, which does not need additional signaling indication, and while transmitting the data packet, the first information is delivered to the first device. Therefore, signaling overhead can be saved and power consumption of the first device can be reduced.

Optionally, as an example, the Layer 2 PDU includes a special field, or includes a special value in the field. After the first device receives the Layer 2 PDU, it determines that the connection state in which the first device and the second device need to be is the second connection state regardless of the value of the special field or the special value in the field. The special field may include an indication field.

In other words, after the first device receives the Layer 2 PDU added with a new field, the first device may determine that the connection state in which the first device and the second device need to be is the second connection state.

Further, as an example, there are multiple connection states between the first device and the second device, and each connection state corresponds to a special field, and the first device may determine the connection state which the first device and the second device need to enter according to the special field (or a position of the special field) included in the Layer 2 PDU. For example, the first connection state corresponds to a special field J, the second connection state corresponds to a special field L, and the third connection state corresponds to a special field T. If the Layer 2 PDU includes the special field T, the first device may determine that the connection state which the first device and the second device need to enter is the third connection state. The implementation of the scheme is flexible.

Specifically, determining by the first device the connection state in which the first device and the second device need to be according to whether the Layer 2 PDU carries a data packet may include: when the Layer 2 PDU carries a data packet, the first device determines that the first device and the second device need to be in the first connection state; when the Layer 2 PDU does not carry any data packet, the first device determines that the first device and the second device need to be in the second connection state.

According to an agreement, whether the Layer 2 PDU carries a data packet may be used as an indication. In the scheme, there is no need to add an indication field or other indication information to the PDU, which can save signaling overhead, reduce the complexity of the Layer 2 PDU, and improve the efficiency of the first device in determining the connection state needed to be in. In other words, when the Layer 2 PDU is a state packet (or an empty packet), the Layer 2 PDU may be used for indicating that the first device and the second device need to be in the second connection state.

Optionally, as an example, the Layer 2 PDU carries second information for indicating a connection state in which the first device and the second device need to be, and determining by the first device the connection state in which the first device and the second device need to be according to the Layer 2 PDU may include: the first device determines the connection state in which the first device and the second device need to be according to the second information carried in the Layer 2 PDU.

In the scheme, the Layer 2 PDU received by the first device carries the second information for directly indicating the connection state in which the first device and the second device need to be. After the first device receives the second information, the first device may directly determine (or know) the connection state in which the first device and the second device need to be, thereby the time delay for the first device to determine the connection state needed to be in can be shortened, and the efficiency of the first device in determining the connection state needed to be in is improved.

In the above, how the first device determines the connection state needed to be in according to a Layer 2 PDU is described in detail in conjunction with FIGS. 2 and 3. If the connection state needed to be in is different from the connection state that the first device and the second device are currently in, the first device needs to change the connection state. Hereinafter, how the first device performs connection state changing will be described in detail.

Optionally, as an example, the first device and the second device are currently in the first connection state, and the connection state in which the first device and the second device need to be is the second connection state. The communication method 100 may further include: the first device starts a first timer after receiving the Layer 2 PDU; or, the first device starts the first timer after sending third information to the second device, wherein the third information is used for indicating that the first device has determined to enter the second connection state (or the third information is used for indicating that the first device has correctly received the Layer 2 PDU); if the first timer expires, the first device changes the connection state from the first connection state to the second connection state. Optionally, the third information may be ACK (acknowledgement) information.

Specifically, the first timer of the first device is used to control the changing of the connection state of the first device. If the Layer 2 PDU does not need to be acknowledged, the first device starts the first timer after receiving the Layer 2 PDU, thus signaling overhead can be saved, and power consumption of the first device can be reduced. If the Layer 2 PDU needs to be acknowledged, the first device starts the first timer after sending the third information, so that the second device can learn the condition of the first device timely, and the second device can change the connection state timely. The first device may acquire a timing duration of the first timer based on protocol specifications or based on other manners, which will be described in detail below.

Optionally, as an example, when the first device and the second device are currently in the first connection state, and the connection state in which the first device and the second device need to be is the first connection state, the first device keeps in the first connection state.

Optionally, as an example, the Layer 2 PDU carries fourth information for indicating the timing duration of the first timer. Starting the first timer may include: starting the first timer according to the fourth information.

Figure 4:
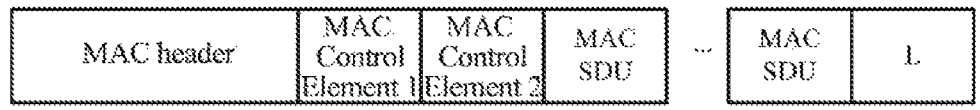
FIG. 4 is a schematic diagram of a layer 2 PDU according to yet another implementation of the present disclosure.

Specifically, the first device may acquire the timing duration of the first timer after receiving the Layer 2 PDU carrying the fourth information. FIG. 4 is a schematic diagram of a Layer 2 PDU according to yet another implementation of the present disclosure. As shown in FIG. 4, the Layer 2 PDU is a MAC PDU, and the tail of the MAC PDU includes an indication field for carrying fourth information. The value and meaning of the indication field may be as shown in table 3.

TABLE 3

| Value of T | Meaning |
| --- | --- |
| 00 | T1 |
| 01 | T2 |
| 10 | T3 |
| 11 | T4 |

In the scheme, the first device may start the first timer according to the fourth information carried in the Layer 2 PDU, so that the first device may change the connection state between the first device and the second device from the first connection state to the second connection state after a certain timing duration according to the indication of the second device.

Optionally, as an example, the Layer 2 PDU carries fifth information for requesting to acquire a timing duration of a second timer of the second device. The communication method 100 further includes: the first device determines the timing duration of the second timer; the first device sends sixth information to the second device, wherein the sixth information is used for indicating the timing duration of the second timer. Starting the first timer includes: the first device starts the first timer after sending the sixth information to the second device; or, the first device starts the first timer after sending the sixth information to the second device and receiving seventh information sent by the second device, wherein the seventh information is used for indicating that the second device has determined to enter the second connection state.

Specifically, after the first device receives the Layer 2 PDU carrying the fifth information, the first device may know that the second device requests to change the connection state between the first device and the second device from the first connection state to the second connection state. The first device may determine that the first device and the second device need to be in the second connection state according to the Layer 2 PDU carrying the fifth information, so that the first device may start the first timer.

It should also be noted that the first device may start the first timer according to the sixth information. In other words, the first device may start the first timer based on the timing duration configured for the second timer, so that the first device and the second device may simultaneously change from the first connection state to the second connection state.

It should further be noted that if the sixth information does not need to be acknowledged, the first device starts the first timer after receiving the Layer 2 PDU and sending the sixth information to the second device. If the sixth information needs to be acknowledged, the first device starts the first timer after sending the sixth information to the second device and receiving the seventh information sent by the second device. The third information and the sixth information may be different information or may be the same information (or information carried in the same field). For example, the sixth information may not only be used for indicating the timing duration of the second timer, but also be used for indicating that the first device has determined to enter the second connection state.

It should be noted that an agreement on whether the information received or sent by the first device needs to be acknowledged may be made by the first device and the second device beforehand. If the information received or transmitted by the first device does not need to be acknowledged, the correct reception of data or signaling may be ensured through multiple transmissions of the information. For example, the second device may send multiple Layer 2 PDUs to the first device so that the first device may correctly receive the Layer 2 PDU. In this case, the first device does not need to send third information to the second device. After receiving the Layer 2 PDU, the first device starts the first timer, and the corresponding second device starts the second timer after sending the multiple Layer 2 PDUs. If the information received or sent by the first device needs to be acknowledged, the first device starts the first timer after sending or receiving the corresponding acknowledgement information (e.g., sending the third information or sending the sixth information).

Optionally, as an example, after the first device receives the Layer 2 PDU sent by the second device, the communication method 100 further includes: the first device sends eighth information to the second device; and/or the first device sends ninth information to the second device, wherein the eighth information is used for indicating that the first device has correctly received the Layer 2 PDU, and the ninth information is used for indicating the connection state in which the first device and the second device need to be.

The first device sends the eighth information to the second device, so as to prevent the second device from repeatedly sending the Layer 2 PDU and save signaling overhead. The first device sends the ninth information to the second device, to timely notify the second device of the connection state that the second device needs to be in. Thus the second device can change the connection state timely, so as to save the power consumption of the second device.

Optionally, the first device may send the ninth information to the second device through high layer signaling, or a PDU, or a physical layer signaling process.

Optionally, as an example, an indication field for carrying the first information, the second information, the fourth information, or the fifth information may be located at the header of the Layer 2 PDU, or at the tail of the Layer 2 PDU, or at any position in the Layer 2 PDU (in other words, the indication field may be a header field or a tail field of the Layer 2 PDU). The indication field may be a newly added field in the PDU, or an existing field containing a special value in the PDU, which is not limited in the present disclosure.

If the above information is located at the header or tail of the Layer 2 PDU, the first device may quickly acquire the above information after receiving the Layer 2 PDU, so that the first device can quickly and efficiently determine the connection state which the first device and the second device need to enter.

Optionally, as an example, the first timer is configured with at least one first timing duration, and the at least one first timing duration includes a timing duration of the first timer indicated by the fourth information. The second timer is configured with at least one second timing duration, and the at least one second timing duration includes a timing duration of the second timer indicated by the sixth information.

Optionally, as an example, the timing duration of the first timer and/or the timing duration of the second timer may be configured by a network-side device or specified through a protocol. The timing duration of the first timer and/or the timing duration of the second timer are/is based on configuration of a terminal or bearer configuration of the terminal. The timing durations of the timers based on the bearing configuration of the terminal will be described in detail below.

The communication method of an implementation of the present disclosure has been described above, and the communication method of another implementation of the present disclosure will be described below.

Figure 5:
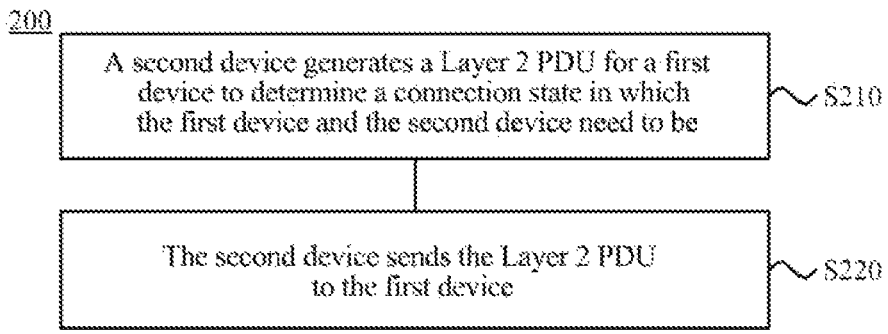
FIG. 5 is a schematic flowchart of a communication method according to another implementation of the present disclosure.

FIG. 5 is a schematic flowchart of a communication method according to another implementation of the present disclosure. As shown in FIG. 5, the communication method 200 may include acts S210 and S220.

In S210, a second device generates a Layer 2 PDU for a first device to determine a connection state in which the first device and the second device need to be.

In S220, the second device sends the Layer 2 PDU to the first device.

Specifically, the Layer 2 PDU generated by the second device may be used by the first device to determine the connection state needed to be in, and the process of sending the Layer 2 PDU by the second device is relatively simple, which can reduce communication complexity, system overhead, and time delay. Furthermore, the execution subject in the scheme is diversified, no matter the second device is a terminal device or a network-side device, the second device may send the Layer 2 PDU to the first device, so that the first device can timely determine the connection state needed to be in.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, as an example, generating by the second device a Layer 2 PDU includes: the second device generates the Layer 2 PDU according to whether there is currently data packet transmission between the first device and the second device and/or whether there is subsequent data transmission between the first device and the second device.

Specifically, the second device may generate the Layer 2 PDU according to the transmission condition between the first device and the second device, so that the first device can timely and accurately determine the connection state needed to be in according to the Layer 2 PDU.

Optionally, as an example, generating by the second device the Layer 2 PDU according to whether there is currently data packet transmission between the first device and the second device and/or whether there is subsequent data transmission between the first device and the second device may include: when there is currently data packet transmission between the first device and the second device, the second device generates the Layer 2 PDU carrying the data packet; when there is currently no data packet transmission between the first device and the second device, the second device generates the Layer 2 PDU carrying no data packet; when there is no subsequent data transmission between the first device and the second device, the second device generates the Layer 2 PDU carrying first information for indicating that there is no subsequent data transmission between the first device and the second device; when there is subsequent data transmission between the first device and the second device, the second device generates the Layer 2 PDU carrying first information for indicating that there is subsequent data transmission between the first device and the second device.

Optionally, as an example, the communication method further includes: the second device determines a connection state in which the first device and the second device need to be; and generating by the second device a Layer 2 PDU includes: the second device generates the Layer 2 PDU carrying second information for indicating the connection state in which the first device and the second device need to be.

Optionally, as an example, the first device and the second device are currently in a first connection state, and the connection state in which the first device and the second device need to be is a second connection state. The communication method further includes: the second device starts a second timer after sending the Layer 2 PDU; or, the second device starts a second timer after receiving third information sent by the first device, wherein the third information is used for indicating that the first device has determined to enter the second connection state; if the second timer expires, the second device changes the connection state from the first connection state to the second connection state.

Optionally, as an example, the second device generates the Layer 2 PDU carrying fourth information for indicating the timing duration of the first timer of the first device, for the first device to start the first timer according to the fourth information.

It should be noted that the second device may start the second timer according to the fourth information. In other words, the second device may start the second timer based on the timing duration configured for the first timer, so that the first device and the second device may simultaneously change from the first connection state to the second connection state.

Optionally, as an example, the Layer 2 PDU carries fifth information, and generating by the second device a Layer 2 PDU includes: the second device generates the Layer 2 PDU carrying fifth information for requesting to acquire the timing duration of the second timer. The communication method further includes: the second device receives sixth information sent by the first device, wherein the sixth information is used for indicating the timing duration of the second timer. Starting the second timer includes: the second device starts the second timer according to the sixth information after receiving the sixth information sent by the first device; or the second device starts the second timer according to the sixth information after receiving the sixth information sent by the first device and sending seventh information to the first device, wherein the seventh information is used for indicating that the second device has determined to enter the second connection state.

Optionally, as an example, after the second device sends the Layer 2 PDU to the first device, the communication method further includes: the second device receives eighth information sent by the first device, or the second device receives ninth information sent by the first device; wherein the eighth information is used for indicating that the first device has correctly received the Layer 2 PDU, and the ninth information is used for indicating the connection state in which the first device and the second device need to be.

It should be noted that the second device in the communication method 200 may correspond to the second device in the communication method 100 described above, and the first device in the communication method 200 may correspond to the first device in the communication method 100 described above. Relevant description in the communication method 100 may be referred to for the description of the Layer 2 PDU, the first timer, the second timer and information carried by the Layer 2 PDU mentioned in the communication method 200, and it will not be repeated here for conciseness.

Figure 6:
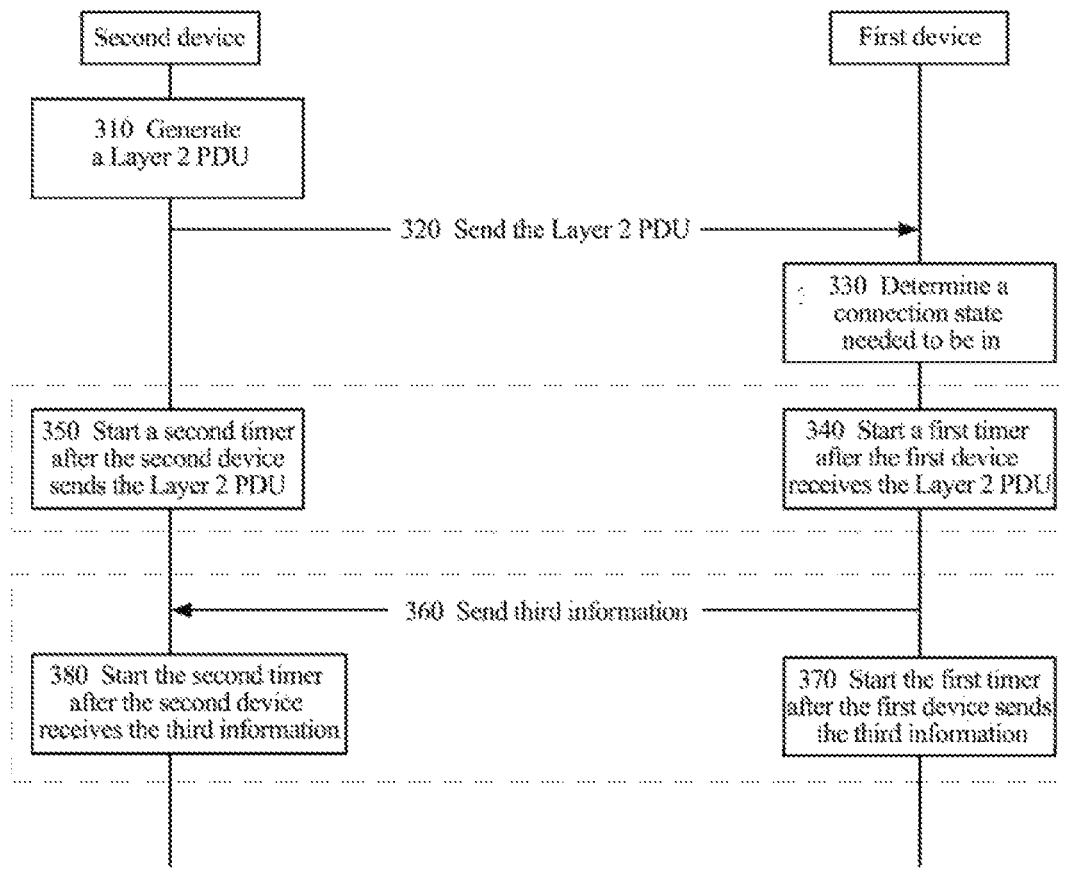
FIG. 6 is a flowchart of interactions in a communication method according to an implementation of the present disclosure.

FIG. 6 is a flowchart of interactions in a communication method according to an implementation of the present disclosure. The description of various terms in the implementation of the present disclosure is the same as those in the above described implementations.

It should be noted that what is described here is to help those skilled in the art to better understand the implementations of the present application, and is not intended to limit the scope of the implementations of the present application. And these acts or operations are merely exemplary, in implementations of the present disclosure, other operations, or variations of the operations in FIG. 6 may be performed. In addition, the acts in FIG. 6 may be performed in an order different from what is shown in FIG. 6, and it is possible that not all operations in FIG. 6 are to be performed.

In 310, a second device generates a Layer 2 PDU.

In 320, the second device sends the Layer 2 PDU to a first device.

In 330, the first device determines a connection state in which the first device and the second device need to be according to the Layer 2 PDU.

When the first device and the second device are currently in a first connection state and the connection state in which the first device and the second device need to be is the first connection state, the first device retains in the first connection state.

When the first device and the second device are currently in the first connection state and the connection state in which the first device and the second device need to be is a second connection state, if the Layer 2 PDU does not need to be acknowledged, acts 340 and 350 are executed after act 330 is executed; and if the Layer 2 PDU needs to be acknowledged, acts 360, 370 and 380 are executed after act 330 is executed.

In 340, the first device starts a first timer after receiving the Layer 2 PDU.

In 350, the second device starts a second timer after sending the Layer 2 PDU.

In 360, the first device sends third information to the second device.

In 370, the first device starts the first timer after sending the third information to the second device.

In 380, the second device starts the second timer after receiving the third information sent by the first device.

It should be noted that an agreement on the time when the first device and the second device start the corresponding timers may be made according to a protocol.

For example, the first device and the second device may make an agreement that there is no need to acknowledge the Layer 2 PDU and the Layer 2 PDU is used to trigger a timer, the second device starts the second timer after sending the Layer 2 PDU, and the first device starts the first timer after receiving the Layer 2 PDU. In other words, as long as there is a Layer 2 PDU transmitted between the first device and the second device, the corresponding timers are started regardless of the content of the Layer 2 PDU.

For another example, the first device and the second device may make an agreement that there is no need to acknowledge the Layer 2 PDU and the timers are started when the connection state is determined to be changed. In such a case, the second device may determine that the connection state needs to be changed before sending the Layer 2 PDU, so that the second device starts the second timer after sending the Layer 2 PDU. The first device determines that the connection state needs to be changed according to the Layer 2 PDU after receiving the Layer 2 PDU, so that the first device starts the first timer after receiving the Layer 2 PDU.

Correspondingly, the first device and the second device may make an agreement that the Layer 2 PDU needs to be acknowledged. Thereby, the first device starts the first timer after sending the third information, and the second device starts the second timer after receiving the third information.

It should be noted that if the connection state between the first device and the second device changes from the first connection state to the second connection state, the first device starts the first timer and the second device starts the second timer, and the timing duration of the first timer and the timing duration of the second timer are the same, so that the first device and the second device may simultaneously enter the second connection state from the first connection state. In the scheme, the first device and the second device may acquire the timing duration based on protocol specifications or based on other manners, and relevant description in implementations of the present disclosure may be referred to for the details, which will not be repeated here.

Figure 7:
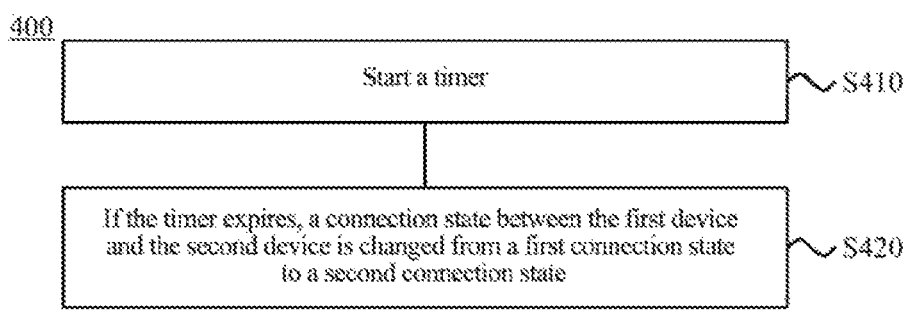
FIG. 7 is a schematic flowchart of a communication method according to yet another implementation of the present disclosure.

FIG. 7 is a schematic flowchart of a communication method according to yet another implementation. The communication method may be executed by a first device or a second device. As shown in FIG. 7, the communication method 400 may include acts S410-S420.

In S410, a timer is started.

In S420, if the timer expires, a connection state between the first device and the second device is changed from a first connection state to a second connection state.

In the scheme, the first device or the second device may change the first connection state to the second connection state based on the timer, and thus complicated signaling for instruction is not needed, which can save signaling overhead and have good compatibility and scalability.

It should be noted that if the execution subject of the communication method 400 is the first device, the first device starts the timer (i.e., the first timer) of the first device. If the execution subject of the scheme is the second device, the second device starts the timer (i.e., the second timer) of the second device. Relevant description in implementations of the present disclosure may be referred to for the description for the timer of the first device or the second device and the description for starting the timer, which are not repeated here.

Optionally, as an example, the connection state in which the first device and the second device need to be includes a first connection state or a second connection state. The first connection state is a connection state between the terminal device and the network-side device when the terminal device is in an active state. The second connection state is a connection state between the terminal device and the network-side device when the terminal device is in an inactive state.

Optionally, as an example, starting a timer includes: the first device starts the timer after sending a data packet or signaling to the second device; or the first device starts the timer after receiving the first information of the data packet or signaling sent by the second device, wherein the first information is used for indicating that the second device has correctly received the data packet or signaling. Optionally, the execution subject of the scheme may be the first device, and the timer is started after a radio bearer between the first device and the second device has been established.

Optionally, as an example, starting a timer includes: the first device starts the timer after receiving a data packet or signaling sent by the second device; or the second device starts the timer after the first device sends second information corresponding to the data packet or signaling to the second device, wherein the second information is used for indicating that the first device has correctly received the data packet or signaling; or the first device starts the timer after a radio bearer between the first device and the second device has been established. Optionally, the execution subject of the scheme may be the second device.

Optionally, as an example, all radio bearers between the first device and the second device correspond to a single timer, starting by the first device the timer after a radio bearer between the first device and the second device has been established includes:

starting the timer after all radio bearers between the first device and the second device have been established.

Optionally, as an example, each radio bearer in all radio bearers between the first device and the second device corresponds to a timer, and starting the timer after a radio bearer between the first device and the second device has been established includes: after each radio bearer between the first device and the second device has been established, starting a corresponding timer. Changing the connection state between the first device and the second device from the first connection state to the second connection state if the time configured by a timer expires includes: changing the connection state between the first device and the second device from the first connection state to the second connection state if all timers corresponding to all radio bearers expire.

For example, assuming that there are eight radio bearers between the first device and the second device, the eight radio bearers correspond to eight timers. After each radio bearer in the eight radio bearers has been established, a corresponding timer is started. When timers corresponding to all radio bearers in the eight radio bearers all expire, the first device and the second device change the connection state between the first device and the second device from the first connection state to the second connection state.

It should be noted that related descriptions for the timer and for starting the timer in the communication method 400 are also applicable to the communication method 100 and the communication method 200.

Figure 8:
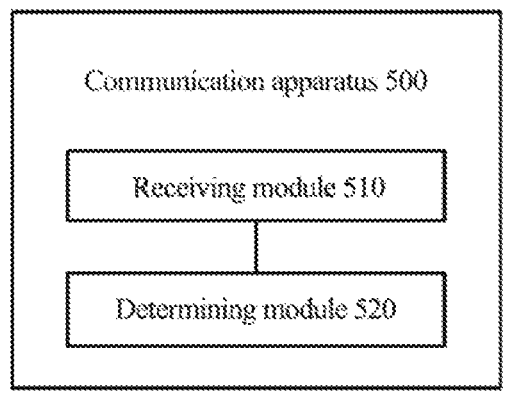
FIG. 8 is a schematic block diagram of a communication apparatus according to an implementation of the present disclosure.

In the above, communication methods of implementations of the present disclosure have been described in detail with reference to FIGS. 1 to 7. Communication apparatuses and communication devices of implementations of the present disclosure will be described in detail below with reference to FIGS. 8 to 13. FIG. 8 is a schematic block diagram of a communication apparatus 500 according to an implementation of the present disclosure. As shown in FIG. 8, a communication apparatus 500, which is a first device, includes a receiving module 510 and a determining module 520.

The receiving module 510 is configured to receive a Layer 2 Protocol Data Unit (PDU) sent by a second device.

The determining module 520 is configured to determine a connection state in which the first device and the second device need to be according to the Layer 2 PDU.

The process of parsing the Layer 2 PDU by the communication apparatus is relatively simple, which can reduce the communication complexity, reduce the system overhead and shorten the time delay for parsing. Furthermore, the scheme can be applied to determine connection states between various communication devices, which has high flexibility and good compatibility and scalability. In addition, the execution subject in the scheme is diversified, and no matter the communication apparatus is a terminal device or a network-side device, the connection state can be changed timely when the connection state needs to be changed.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is the connection state between the terminal device and the network-side device when the terminal device is in an inactive state.

Optionally, as an example, the determining module 520 is specifically configured to determine a connection state in which the first device and the second device need to be according to whether the Layer 2 PDU carries a data packet or according to first information carried in the Layer 2 PDU, wherein the first information is used for indicating whether there is subsequent data transmission between the first device and the second device.

Optionally, as an example, the determining module 520 is specifically configured to determine that the first device and the second device need to be in the first connection state when the first information is used for indicating that there is subsequent data transmission between the first device and the second device; and determine that the first device and the second device need to be in the second connection state when the first information is used for indicating that there is no subsequent data transmission between the first device and the second device.

Optionally, as an example, the determining module 520 is specifically configured to determine that the first device and the second device need to be in the first connection state when the Layer 2 PDU carries a data packet; and determine that the first device and the second device need to be in the second connection state when the Layer 2 PDU does not carry any data packet.

Optionally, as an example, the Layer 2 PDU carries second information for indicating the connection state in which the first device and the second device need to be, and the determining module 520 is specifically configured to determine the connection state in which the second device and the second device need to be according to second information carried in the Layer 2 PDU.

Optionally, as an example, the first device and the second device are currently in the first connection state, and the connection state in which the first device and the second device need to be is the second connection state, the communication apparatus 500 further includes a processing module configured to start a first timer after the receiving module 510 receives the Layer 2 PDU. Alternatively, the communication apparatus 500 further includes a sending module configured to send third information to the second device; and the processing module is configured to start a first timer after the sending module sends the third information, wherein the third information is used for indicating that the first device has determined to enter the second connection state. The processing module is further configured to change the connection state from the first connection state to the second connection state if the first timer expires.

Optionally, as an example, the Layer 2 PDU carries fourth information for indicating a timing duration of the first timer. The processing module is specifically configured to start the first timer according to the fourth information.

Optionally, as an example, the Layer 2 PDU carries fifth information for requesting to acquire a timing duration of a second timer of the second device. The determining module 520 is further configured to determine the timing duration of the second timer. The sending module is further configured to send sixth information to the second device, wherein the sixth information is used for indicating the timing duration of the second timer. The processing module is specifically configured to start the first timer after the sending module sends the sixth information to the second device; or start the first timer after the sending module sends the sixth information to the second device and the receiving module 510 receives seventh information sent by the second device, wherein the seventh information is used for indicating that the second device has determined to enter the second connection state.

Optionally, as an example, the communication apparatus further includes a sending module configured to send eighth information to the second device, wherein the eighth information is used for indicating that the first device has correctly received the Layer 2 PDU; and/or send ninth information to the second device, wherein the ninth information is used for indicating the connection state in which the first device and the second device need to be.

It should be noted that the communication apparatus 500 may correspond to the first device in the communication methods according to implementations of the present disclosure, and the respective modules in the communication apparatus 500 and the other operations or functions described above are for implementing the corresponding processes performed by the first device in the implementations shown in FIGS. 1 to 6, respectively, which are not described here for the sake of conciseness.

Figure 9:
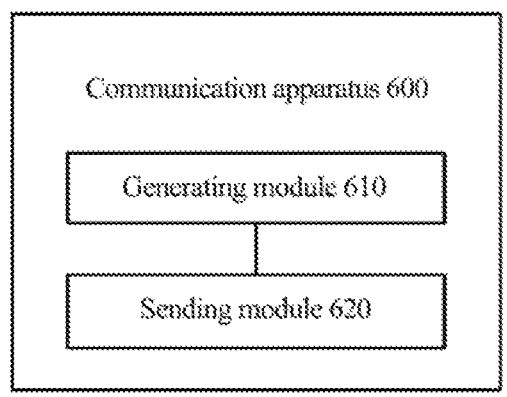
FIG. 9 is a schematic block diagram of a communication apparatus according to another implementation of the present disclosure.

FIG. 9 is a schematic block diagram of a communication apparatus 600 according to yet another implementation of the present disclosure. As shown in FIG. 9, a communication apparatus 600 may include a generating module 610 and a sending module 620.

The generating module 610 is configured to generate a Layer 2 Protocol Data Unit (PDU), and the Layer 2 PDU is used for a first device to determine a connection state in which the first device and a second device need to be.

The sending module 620 is configured to send the Layer 2 PDU to the first device.

The process of sending the Layer 2 PDU by the communication apparatus is relatively simple, which can reduce the communication complexity, reduce the system overhead and shorten the time delay. Furthermore, the execution subject in the scheme is diversified, regardless of whether the communication apparatus is a terminal device or a network-side device, the Layer 2 PDU can be sent to the first device, so that the first device can timely determine the connection state needed to be in.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, the generating module 610 is specifically configured to generate the Layer 2 PDU according to whether there is currently data packet transmission between the first device and the second device and/or whether there is subsequent data transmission between the first device and the second device.

Optionally, the generating module 610 is specifically configured to generate the Layer 2 PDU carrying the data packet when there is currently data packet transmission between the first device and the second device; to generate the Layer 2 PDU that does not carry any data packet when there is currently no data packet transmission between the first device and the second device; to generate the Layer 2 PDU carrying first information for indicating that there is no subsequent data transmission between the first device and the second device when there is no subsequent data transmission between the first device and the second device; and to generate the Layer 2 PDU carrying first information for indicating that there is subsequent data transmission between the first device and the second device when there is subsequent data transmission between the first device and the second device.

Optionally, the communication apparatus 600 further includes a determining module configured to determine the connection state in which the first device and the second device need to be. The generating module 610 is specifically configured to generate the Layer 2 PDU carrying second information for indicating the connection state in which the first device and the second device need to be.

Optionally, as an example, the first device and the second device are currently in a first connection state, and the connection state in which the first device and the second device need to be is a second connection state. The communication apparatus 600 further includes a processing module configured to start a second timer after the sending module 620 sends the Layer 2 PDU. Alternatively, the communication apparatus further includes a receiving module configured to receive third information sent by the first device, and the processing module is configured to start the second timer after the receiving module receives the third information, wherein the third information is used for indicating that the first device has determined to enter the second connection state. The processing module is further configured to change the connection state from the first connection state to the second connection state if the second timer expires.

Optionally, as an example, the generating module 610 is specifically configured to generate the Layer 2 PDU carrying fourth information for indicating the timing duration of the first timer of the first device, so that the first device starts the first timer according to the fourth information.

Optionally, as an example, the generating module 610 is specifically configured to generate the Layer 2 PDU carrying fifth information for requesting to acquire a timing duration of the second timer. The receiving module is further configured to receive sixth information sent by the first device, wherein the sixth information is used for indicating the timing duration of the second timer. The processing module is specifically configured to start the second timer according to the sixth information after the receiving module receives the sixth information; or start the second timer according to the sixth information after the receiving module receives the sixth information sent by the first device and the sending module 620 sends seventh information to the first device, wherein the seventh information is used for indicating that the second device has determined to enter the second connection state.

Optionally, as an example, the communication apparatus 600 includes a receiving module configured to receive the eighth information sent by the first device, wherein the eighth information is used for indicating that the first device has correctly received the Layer 2 PDU; or receive ninth information sent by the first device, wherein the ninth information is used for indicating the connection state in which the first device and the second device need to be.

It should be noted that the communication apparatus 600 may corresponds to the second device in the communication methods according to implementations of the present disclosure, and the respective modules in the communication apparatus 600 and the other operations or functions described above are for implementing the corresponding processes performed by the second device in the implementations shown in FIGS. 1 to 6, respectively, which are not described here for the sake of conciseness.

Figure 10:
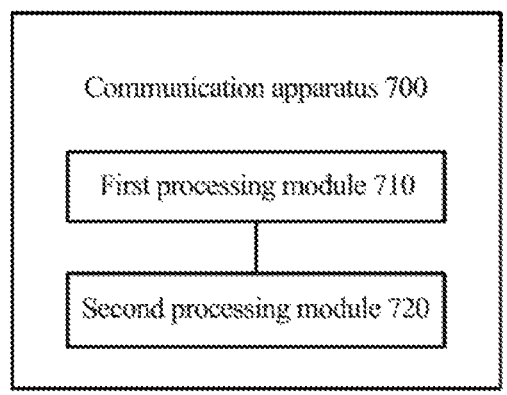
FIG. 10 is a schematic block diagram of a communication apparatus according to yet another implementation of the present disclosure.

FIG. 10 is a schematic block diagram of a communication apparatus 700 according to another implementation of the present disclosure. As shown in FIG. 10, the communication apparatus 700 may include a first processing module 710 and a second processing module 720.

The first processing module 710 is configured to start a timer.

The second processing module 720 is configured to change a connection state between a first device and a second device from a first connection state to a second connection state if the timer expires.

The communication apparatus may change the first connection state to the second connection state based on the timer. The scheme is simple to control and has good compatibility and expansibility.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, as an example, the first processing module 710 is specifically configured to start the timer after the first device sends a data packet or signaling to the second device; or start the timer after the first device receives first information of the data packet or signaling sent by the second device, wherein the first information is used for indicating that the second device has correctly received the data packet or signaling.

Optionally, as an example, the first processing module 710 is specifically configured to start the timer after the second device receives the data packet or signaling sent by the first device; or start the timer after the second device sends second information corresponding to the data packet or signaling to the first device, wherein the second information is used for indicating that the second device has correctly received the data packet or signaling; or start the timer after a radio bearer between the first device and the second device has been established.

Optionally, as an example, all radio bearers between the first device and the second device correspond to a single timer, and the first processing module 710 is specifically configured to start the timer after all radio bearers between the first device and the second device have been established.

Optionally, as an example, each radio bearer in all radio bearers between the first device and the second device corresponds to a timer, and the first processing module 710 is specifically configured to start a corresponding timer after each radio bearer between the first device and the second device have been established. The second processing module 720 is specifically configured to change the connection state between the first device and the second device from the first connection state to the second connection state if all timers corresponding to all radio bearers expire.

It should be noted that the communication apparatus 700 may corresponds to the execution subject in the communication method 400 according to the implementation of the present disclosure, and the respective modules in the communication apparatus 700 and the other operations or functions described above are for implementing the corresponding processes performed by the communication method 400 in the implementation shown in FIG. 7, which is not described here for the sake of conciseness.

Figure 11:
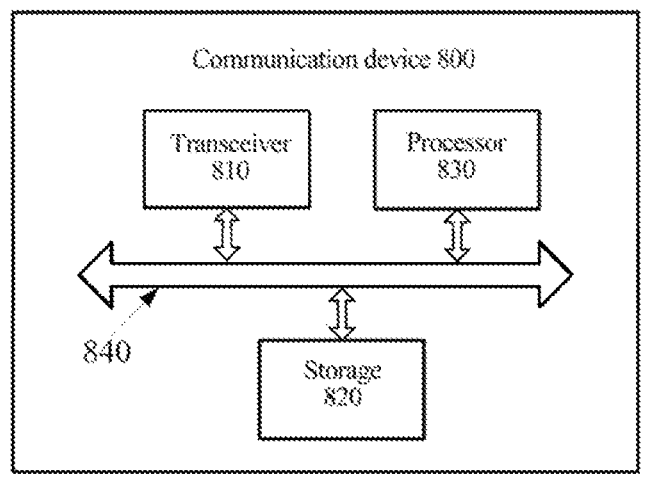
FIG. 11 is a schematic block diagram of a communication device according to an implementation of the present disclosure.

FIG. 11 is a schematic block diagram of a communication device 800 according to yet another implementation of the present disclosure. As shown in FIG. 11, the communication device 800 includes a transceiver 810, a storage 820, a processor 830, and a bus system 840. The transceiver 810, the storage 820 and the processor 830 are connected through the bus system 840. The storage 820 is configured to store instructions, and the processor 830 is configured to execute instructions stored in the storage 820 to control the transceiver 810 to transmit and receive signals.

The transceiver 810 is configured to receive a Layer 2 Protocol Data Unit (PDU) sent by a second device.

The processor 830 is configured to determine a connection state in which a first device and the second device need to be according to the Layer 2 PDU.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, as an example, the processor 830 is specifically configured to determine the connection state in which the first device and the second device need to be according to whether the Layer 2 PDU carries a data packet or according to first information carried in the Layer 2 PDU, wherein the first information is used for indicating whether there is subsequent data transmission between the first device and the second device.

Optionally, as an example, the processor 830 is specifically configured to determine that the first device and the second device need to be in a first connection state when the first information is used for indicating that there is subsequent data transmission between the first device and the second device; determine that the first device and the second device need to be in a second connection state when the first information is used for indicating that there is no subsequent data transmission between the first device and the second device.

Optionally, as an example, the processor 830 is specifically configured to determine that the first device and the second device need to be in the first connection state when the Layer 2 PDU carries a data packet; determine that the first device and the second device need to be in the second connection state when the Layer 2 PDU does not carry any data packet.

Optionally, as an example, the Layer 2 PDU carries second information for indicating the connection state in which the first device and the second device need to be. The processor 830 is specifically configured to determine the connection state in which the first device and the second device need to be according to the second information carried in the Layer 2 PDU.

Optionally, as an example, the first device and the second device are currently in the first connection state, and the connection state in which the first device and the second device need to be is the second connection state. The processor 830 is further configured to start a first timer after the transceiver 810 receives the Layer 2 PDU. Alternatively, the transceiver 810 is further configured to send third information to the second device, and the processor 830 is further configured to start the first timer after the transceiver 810 sends third information. The third information is used for indicating that the first device has determined to enter the second connection state. The processor 830 is further configured to change the connection state from the first connection state to the second connection state if the first timer expires.

Optionally, as an example, the Layer 2 PDU carries fourth information for indicating a timing duration of the first timer, and the processor 830 is specifically configured to start the first timer according to the fourth information.

Optionally, as an example, the Layer 2 PDU carries fifth information for requesting to acquire a timing duration of a second timer of the second device. The processor 830 is further configured to determine the timing duration of the second timer. The transceiver 810 is further configured to send sixth information to the second device, wherein the sixth information is used for indicating the timing duration of the second timer. The processor 830 is specifically configured to start the first timer after the transceiver 810 sends the sixth information to the second device; or start the first timer after the transceiver 810 sends the sixth information to the second device and the transceiver 810 receives seventh information sent by the second device, wherein the seventh information is used for indicating that the second device has determined to enter the second connection state.

Optionally, the transceiver 810 is further configured to send eighth information to the second device, wherein the eighth information is used for indicating that the first device has correctly received the Layer 2 PDU; and/or send ninth information to the second device, wherein the ninth information is used for indicating a connection state in which the first device and the second device need to be.

It should be noted that the communication device 800 may correspond to the first device in the communication methods according to implementations of the present disclosure, and the respective modules in the communication device 800 and the other operations or functions described above are for implementing the corresponding processes performed by the first device in the implementations shown in FIG. 1 to FIG. 6, respectively, which are not described here for the sake of conciseness.

Figure 12:
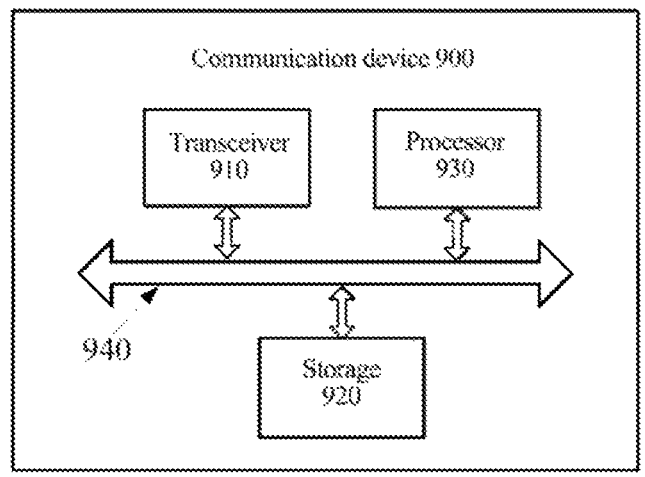
FIG. 12 is a schematic block diagram of a communication device according to another implementation of the present disclosure.

FIG. 12 is a schematic block diagram of a communication device 900 according to yet another implementation of the present disclosure. As shown in FIG. 12, the communication device 900 includes a transceiver 910, a storage 920, a processor 930, and a bus system 940. The transceiver 910, the storage 920 and the processor 930 are connected through the bus system 940. The storage 920 is configured to store instructions, and the processor 930 is configured to execute instructions stored in the storage 920 to control the transceiver 910 to transmit and receive signals.

The processor 930 is configured to generate a Layer 2 Protocol Data Unit (PDU), wherein the Layer 2 PDU is used for a first device to determine a connection state in which the first device and a second device need to be; and send the Layer 2 PDU to the first device.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, as an example, the processor 930 is specifically configured to generate the Layer 2 PDU according to whether there is currently data packet transmission between the first device and the second device and/or whether there is subsequent data transmission between the first device and the second device.

Optionally, as an example, the processor 930 is specifically configured to generate the Layer 2 PDU carrying a data packet when there is currently data packet transmission between the first device and the second device; to generate the Layer 2 PDU that does not carry any data packet when there is currently no data packet transmission between the first device and the second device; to generate the Layer 2 PDU carrying first information for indicating that there is no subsequent data transmission between the first device and the second device when there is no subsequent data transmission between the first device and the second device; and to generate the Layer 2 PDU carrying first information for indicating that there is subsequent data transmission between the first device and the second device when there is subsequent data transmission between the first device and the second device.

Optionally, as an example, the processor 930 is further configured to determine the connection state in which the first device and the second device need to be. The processor 930 is specifically configured to generate the Layer 2 PDU carrying second information for indicating the connection state in which the first device and the second device need to be.

Optionally, as an example, the first device and the second device are currently in a first connection state, and the connection state in which the first device and the second device need to be is a second connection state. The processor 930 is further configured to start a second timer after the transceiver 910 sends the Layer 2 PDU; or start a second timer after the transceiver 910 receives third information sent by the first device, wherein the third information is used for indicating that the first device has determined to enter the second connection state; if the second timer expires, change the connection state from the first connection state to the second connection state.

Optionally, as an example, the processor 930 is specifically configured to generate the Layer 2 PDU carrying fourth information for indicating a timing duration of the first timer of the first device, for the first device to start the first timer according to the fourth information.

Optionally, as an example, the processor 930 is specifically configured to generate the Layer 2 PDU carrying fifth information for requesting to acquire a timing duration of the second timer. The transceiver 910 is further configured to receive sixth information sent by the first device, wherein the sixth information is used for indicating the timing duration of the second timer. The processor 930 is specifically configured to start the second timer according to the sixth information after the transceiver 910 receives the sixth information sent by the first device; or start the second timer according to the sixth information after the transceiver 910 receives the sixth information sent by the first device and the transceiver 910 sends seventh information to the first device, wherein the seventh information is used for indicating that the second device has determined to enter the second connection state.

Optionally, as an example, the transceiver 910 is further configured to receive eighth information sent by the first device, wherein the eighth information is used for indicating that the first device has correctly received the Layer 2 PDU; or receive ninth information sent by the first device, wherein the ninth information is used for indicating the connection state in which the first device and the second device need to be.

It should be noted that the communication device 900 may correspond to the second device in the communication methods according to implementations of the present disclosure, and the respective modules in the communication device 900 and the other operations or functions described above are for implementing the corresponding processes performed by the second device in the implementations shown in FIGS. 1 to 6, respectively, which are not described here for the sake of conciseness.

Figure 13:
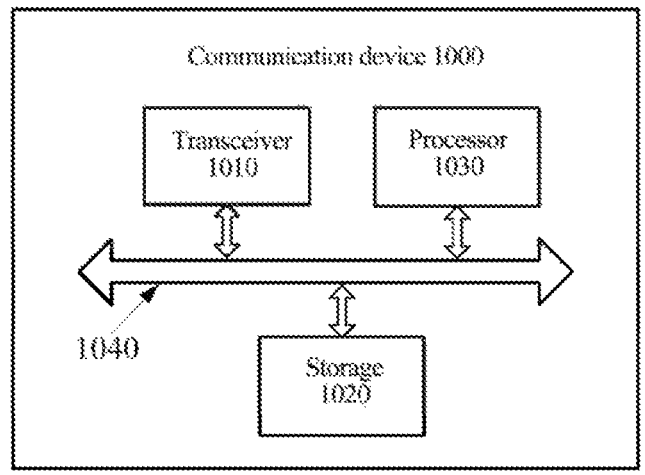
FIG. 13 is a schematic block diagram of a communication device according to yet another implementation of the present disclosure.

FIG. 13 is a schematic block diagram of a communication device 1000 according to another implementation of the present disclosure. As shown in FIG. 13, the communication device 1000 includes a transceiver 1010, a storage 1020, a processor 1030 and a bus system 1040. The transceiver 1010, the storage 1020 and the processor 1030 are connected through the bus system 1040. The storage 1020 is configured to store instructions, and the processor 1030 is configured to execute instructions stored in the storage 1020 to control the transceiver 1010 to transmit and receive signals.

The processor 1030 is configured to start a timer; if the timer expires, change a connection state between a first device and a second device from a first connection state to a second connection state.

The communication device may change the first connection state to the second connection state based on the timer, and the scheme is simple to control and has good compatibility and expandability.

Optionally, as an example, the first device is a terminal device and the second device is a network-side device; or, the first device is a network-side device and the second device is a terminal device. The connection state in which the first device and the second device need to be includes a first connection state or a second connection state. The first connection state is a connection state between the terminal device and the network-side device when the terminal device is in an active state; the second connection state is a connection state between the terminal device and the network-side device when the terminal device is in an inactive state.

Optionally, as an example, the processor 1030 is specifically configured to start the timer after the first device sends a data packet or signaling to the second device; or start the timer after the first device receives first information of the data packet or signaling sent by the second device, wherein the first information is used for indicating that the second device has correctly received the data packet or signaling.

Optionally, as an example, the processor 1030 is specifically configured to start the timer after the second device receives the data packet or signaling sent by the first device; or start the timer after the second device sends second information corresponding to the data packet or signaling to the first device, wherein the second information is used for indicating that the second device has correctly received the data packet or signaling; or start the timer after a radio bearer between the first device and the second device has been established.

Optionally, as an example, all radio bearers between the first device and the second device correspond to a single timer, and the processor 1030 is specifically configured to start the timer after all radio bearers between the first device and the second device have been established.

Optionally, as an example, each radio bearer in all radio bearers between the first device and the second device corresponds to a timer, and the processor 1030 is specifically configured to start a corresponding timer after each radio bearer between the first device and the second device is established; if all timers corresponding to all radio bearers expire, change the connection state between the first device and the second device from the first connection state to the second connection state.

It should be noted that the communication device 1000 may correspond to the execution subject in the communication method 400 according to the implementation of the present disclosure, and the respective modules in the communication device 1000 and the other operations or functions described above are for implementing the corresponding processes performed by the communication method 400 in the implementation shown in FIG. 7, which is not described here for the sake of conciseness.

It should be understood that in implementations of the present disclosure, the processor may adopt a general-purpose Central Processing Unit (CPU), a microprocessor, an Application Specific Integrated Circuit (ASIC), or one or more integrated circuits for executing related programs, to implement the technical schemes provided by implementations of the present disclosure.

The transceiver may implement communication between mobile terminal device and other devices or communication networks.

The storage may include read-only memory and random access memory, and provide instructions and data to the processor. A portion of the processor may also include non-volatile random access memory. For example, the processor may also store information indicating a device type.

In addition to the data bus, the bus system may also include a power bus, a control bus, a state signal bus, etc. For the sake of clarity, various buses are designated as the bus system in the figures.

In the implementation process, the various acts of the above methods may be achieved in the form of hardware, such as an integrated logic circuit, or software, such as instructions, in the processor. The communication methods disclosed in combination with the implementations of the present disclosure may be embodied to be directly implemented by the hardware processor, or by a combination of hardware and software modules in the processor. The software modules may be stored in commonly used storage medium in the art, such as random access memory, flash memory, read-only memory, programmable read-only memory, electrically erasable programmable memory, or registers. The storage medium is in the storage, and the processor reads the information in the storage and accomplishes the acts of the above methods in combination with its hardware. To avoid repetition, it will not be described in detail here.

It should also be understood that in implementations of the present disclosure, "B corresponding to A" indicates that B is associated with A, and B may be determined according to A. It should also be understood that determining B according to A not only refers to determining B only according to A, but also refers to determining B according to A and/or other information. It should be understood that the term "and/or" in this disclosure is merely an association relationship describing associated objects, indicating that there may be three relationships. For example, A and/or B may indicate there are three situations: A alone, A and B at the same time, and B alone. In addition, the character "/" in the disclosure generally indicates that objects before and after the character "/" is in an "or" relationship.

It should be understood that in various implementations of the present disclosure, the values of sequence numbers in each of the above-mentioned processes do not indicate an order of execution, and the order of execution of each process should be determined by its function and internal logic, and should not constitute any limitation to implementation processes of the implementations of the present disclosure.

Those of ordinary skill in the art can understand that the exemplary elements and algorithm steps described in the implementations disclosed in this disclosure may be implemented in electronic hardware, or a combination of computer software and electronic hardware. Whether these functions are implemented in hardware or software depends on specific application scenarios and design constraints of the technical schemes. Those skilled in the art may use different methods to implement the described functions for each specific application scenario, and such implementations should not be considered to be beyond the scope of the present disclosure.

Those skilled in the art can clearly understand that for convenience and conciseness of description, the specific working processes of the system, device and unit described above may refer to corresponding processes in the aforementioned method implementations, and will not be repeated here.

In several implementations provided in the disclosure, it should be understood that the disclosed system, apparatus, and method may be implemented in other ways. For example, the apparatus implementations described above are only illustrative, for example, the categorization of units is only a logical function categorization, and there may be other categorizations in actual implementation, for example, multiple units or components may be combined or integrated into another system, or some features may be ignored or not executed. On the other hand, the mutual coupling, or direct coupling, or communication connection, shown or discussed, may be indirect coupling or communication connection through some interfaces, devices, or units, and may be in electrical, mechanical or in other forms.

The unit described as a separate component may or may not be physically separated, and a component shown as a unit may or may not be a physical unit, i.e., may be located in one place, or may be distributed over multiple network elements. Some or all of the elements may be selected according to actual requirements to achieve the purpose of the implementations.

In addition, various functional units in various implementations of the present disclosure may be integrated in one processing unit, may be physically alone, or may be integrated with two or more units into one unit.

To make the application document concise and clear, the technical features and descriptions in an implementation above may be understood to be applicable to other implementations, for example, the technical features in a method implementation may be applicable to device implementations or other method implementations, and will not be described in detail in other implementations.

The functions may be stored in a computer readable storage medium if implemented in the form of software functional units, and sold or used as separate products. Based on this, a technical scheme of the present disclosure, in essence, or a part contributing to the related art, or a part of the technical scheme, may be embodied in the form of a software product. The computer software product is stored in a storage medium and includes some instructions to make a computer device (which may be a personal computer, a server, or a network device, etc.) to perform all or part of the acts of a method in various implementations of the present disclosure. The aforementioned storage medium include various medium capable of storing program codes, such as U disk, mobile hard disk, read-only memory, random access memory, magnetic disk, or optical disk.

The foregoing is only specific implementations of the present disclosure, but the protection scope of the present disclosure is not limited thereto. Variations or substitutions within the technical scope disclosed by the present disclosure, which may easily be conceived by any person skilled in the art, should be included within the protection scope of the present disclosure. Therefore, the protection scope of the present disclosure should be subject to the protection scope of the claims.

What is claimed is:

1. A communication method, comprising:
   receiving, by a first device, a Layer 2 Protocol Data Unit (PDU) sent by a second device;
   determining, by the first device, a connection state in which the first device and the second device need to be according to the Layer 2 PDU, wherein the first device and the second device are currently in a first connection state, and the connection state in which the first device and the second device need to be is a second connection state;
   starting, by the first device, a first timer after receiving the Layer 2 PDU; or, starting, by the first device, a first timer after sending third information to the second device, wherein the third information is used for indicating that the first device has determined to enter the second connection state;
   changing, by the first device, the connection state from the first connection state to the second connection state when the first timer expires, wherein the Layer 2 PDU carries fifth information for requesting to acquire a timing duration of a second timer of the second device;
   determining, by the first device, the timing duration of the second timer; and
   sending, by the first device, sixth information to the second device, wherein the sixth information is used for indicating the timing duration of the second timer, wherein starting the first timer comprises:
   starting, by the first device, the first timer after sending the sixth information to the second device; or
   starting, by the first device, the first timer after sending the sixth information to the second device and receiving seventh information sent by the second device, wherein the seventh information is used for indicating that the second device has determined to enter the second connection state.

2. The communication method according to claim 1, wherein the first device is a terminal device and the second device is a network-side device; or, the first device is a network-side device and the second device is a terminal device; and the connection state in which the first device and the second device need to be comprises a first connection state or a second connection state, wherein the first connection state is a connection state between the terminal device and the network-side device when the terminal device is in an active state; the second connection state is a connection state between the terminal device and the network-side device when the terminal device is in an inactive state.

3. The communication method according to claim 1, wherein determining, by the first device, the connection state in which the first device and the second device need to be according to the Layer 2 PDU comprises:

determining, by the first device, the connection state in which the first device and the second device need to be according to whether the Layer 2 PDU carries a data packet or according to first information carried in the Layer 2 PDU, wherein the first information is used for indicating whether there is subsequent data transmission between the first device and the second device.

4. The communication method according to claim 3, wherein determining, by the first device, the connection state in which the first device and the second device need to be according to whether the Layer 2 PDU carries a data packet or according to the first information carried in the Layer 2 PDU comprises:

determining that the first device and the second device need to be in a first connection state when the first information indicates that there is subsequent data transmission between the first device and the second device; and determining that the first device and the second device need to be in a second connection state when the first information indicates that there is no subsequent data transmission between the first device and the second device.

5. The communication method according to claim 3, wherein determining, by the first device, the connection state in which the first device and the second device need to be according to whether the Layer 2 PDU carries a data packet or according to the first information carried in the Layer 2 PDU comprises:

determining that the first device and the second device need to be in a first connection state when the Layer 2 PDU carries a data packet; and determining that the first device and the second device need to be in a second connection state when the Layer 2 PDU does not carry any data packet.

6. The communication method according to claim 1, wherein the Layer 2 PDU carries second information for indicating the connection state in which the first device and the second device need to be; and determining, by the first device, the connection state in which the first device and the second device need to be according to the Layer 2 PDU comprises:

determining, by the first device, the connection state in which the first device and the second device need to be according to the second information carried in the Layer 2 PDU.

7. The communication method according to claim 1, wherein the Layer 2 PDU carries fourth information for indicating a timing duration of the first timer, and starting the first timer comprises:
starting the first timer according to the fourth information.

8. The communication method according to claim 1, wherein after the first device receives the Layer 2 PDU sent by the second device, the communication method further comprises:

sending, by the first device, eighth information to the second device, wherein the eighth information is used for indicating that the first device has correctly received the Layer 2 PDU; or sending, by the first device, ninth information to the second device, wherein the ninth information is used for indicating the connection state in which the first device and the second device need to be; or sending, by the first device, eighth information to the second device, wherein the eighth information is used for indicating that the first device has correctly received the Layer 2 PDU, and sending, by the first device, ninth information to the second device, wherein the ninth information is used for indicating the connection state in which the first device and the second device need to be.

9. A communication method, comprising:

generating, by a second device, a Layer 2 Protocol Data Unit (PDU) which is used for a first device to determine a connection state in which the first device and the second device need to be;

sending, by the second device, the Layer 2 PDU to the first device, wherein the first device and the second device are currently in a first connection state, and the connection state in which the first device and the second device need to be is a second connection state;

starting, by the second device, a second timer after sending the Layer 2 PDU to the first device; or, starting, by the second device, a second timer after receiving third information sent by the first device, wherein the third information is used for indicating that the first device has determined to enter the second connection state;

changing, by the second device, the connection state from the first connection state to the second connection state when the second timer expires, wherein generating, by the second device, the Layer 2 PDU comprises: generating, by the second device, the Layer 2 PDU carrying fifth information for requesting to acquire a timing duration of the second timer; and receiving, by the second device, sixth information sent by the first device, wherein the sixth information is used for indicating the timing duration of the second timer, wherein starting the second timer comprises:

starting, by the second device, the second timer according to the sixth information after receiving the sixth information sent by the first device; or starting, by the second device, the second timer according to the sixth information after receiving the sixth information sent by the first device and sending seventh information to the first device, wherein the seventh information is used for indicating that the second device has determined to enter the second connection state.

10. The communication method according to claim 9, wherein the first device is a terminal device and the second device is a network-side device; or, the first device is a network-side device and the second device is a terminal device; and the connection state in which the first device and the second device need to be comprises a first connection state or a second connection state, wherein the first connection state is a connection state between the terminal device and the network-side device when the terminal device is in an active state; the second connection state is a connection state between the terminal device and the network-side device when the terminal device is in an inactive state.

11. The communication method according to claim 9, wherein generating, by the second device, a Layer 2 PDU comprises:

generating, by the second device, the Layer 2 PDU according to whether there is currently data packet transmission between the first device and the second device, or according to whether there is subsequent data transmission between the first device and the second device, or according to whether there is currently data packet transmission between the first device and the second device and whether there is subsequent data transmission between the first device and the second device.

12. The communication method according to claim 11, wherein generating, by the second device, the Layer 2 PDU according to whether there is currently data packet transmission between the first device and the second device, or according to whether there is subsequent data transmission between the first device and the second device, or according to whether there is currently data packet transmission between the first device and the second device and whether there is subsequent data transmission between the first device and the second device, comprises:

generating, by the second device, the Layer 2 PDU carrying a data packet when there is currently data packet transmission between the first device and the second device;

generating, by the second device, the Layer 2 PDU without carrying any data packet when there is currently no data packet transmission between the first device and the second device;

generating, by the second device, the Layer 2 PDU carrying first information for indicating that there is no subsequent data transmission between the first device and the second device when there is no subsequent data transmission between the first device and the second device; and generating, by the second device, the Layer 2 PDU carrying first information for indicating that there is subsequent data transmission between the first device and the second device when there is subsequent data transmission between the first device and the second device.

13. The communication method according to claim 9, wherein the communication method further comprises:

determining, by the second device, the connection state in which the first device and the second device need to be; and wherein generating, by the second device, the Layer 2 PDU comprises:

generating, by the second device, the Layer 2 PDU carrying second information for indicating the connection state in which the first device and the second device need to be.

14. The communication method according to claim 9, wherein generating, by the second device, the Layer 2 PDU, comprises:

generating, by the second device, the Layer 2 PDU carrying fourth information for indicating a timing duration of a first timer of the first device, for the first device to start the first timer according to the fourth information.

15. The communication method according to claim 9, wherein after the second device sends the Layer 2 PDU to the first device, the communication method further comprises:

receiving, by the second device, eighth information sent by the first device, wherein the eighth information is used for indicating that the first device has correctly received the Layer 2 PDU; or receiving, by the second device, ninth information sent by the first device, wherein the ninth information is used for indicating the connection state in which the first device and the second device need to be.

16. A communication device, wherein the communication device is a first device, and the communication device comprises:

a transceiver configured to receive a Layer 2 Protocol Data Unit (PDU) sent by a second device; and a processor configured to:

determine a connection state in which the first device and the second device need to be according to the Layer 2 PDU, wherein the first device and the second device are currently in a first connection state, and the connection state in which the first device and the second device need to be is a second connection state;

start a first timer after the transceiver receives the Layer 2 PDU, or after the transceiver sends a third information used for indicating that the first device has determined to enter the second connection state;

change the connection state from the first connection state to the second connection state when the first timer expires, wherein the Layer 2 PDU carries fifth information for requesting to acquire a timing duration of a second timer of the second device;

determine the timing duration of the second timer; and send sixth information to the second device, wherein the sixth information is used for indicating the timing duration of the second timer, wherein the processor configured to start the first timer is further configured to:

start the first timer after the transceiver sends the sixth information; or start the first timer after the transceiver sends the sixth information and receives seventh information sent by the second device, wherein the seventh information is used for indicating that the second device has determined to enter the second connection state.

* * * * *